US012489225B2

(12) United States Patent
Sudo et al.

(10) Patent No.: US 12,489,225 B2
(45) Date of Patent: Dec. 2, 2025

(54) ANTENNA MODULE AND COMMUNICATION APPARATUS EQUIPPED WITH THE SAME

(71) Applicant: Murata Manufacturing Co., Ltd., Nagaokakyo (JP)

(72) Inventors: Kaoru Sudo, Nagaokakyo (JP); Kengo Onaka, Nagaokakyo (JP); Natsumi Minamitani, Nagaokakyo (JP); Yoshiki Yamada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 156 days.

(21) Appl. No.: 18/460,692

(22) Filed: Sep. 5, 2023

(65) Prior Publication Data

US 2023/0411870 A1 Dec. 21, 2023

Related U.S. Application Data

(63) Continuation of application No. PCT/JP2022/006144, filed on Feb. 16, 2022.

(30) Foreign Application Priority Data

Mar. 5, 2021 (JP) ................................ 2021-035371

(51) Int. Cl.
*H01Q 21/06* (2006.01)
*H01Q 9/04* (2006.01)

(52) U.S. Cl.
CPC ......... *H01Q 21/065* (2013.01); *H01Q 9/0442* (2013.01)

(58) Field of Classification Search
CPC ...... H01Q 21/065; H01Q 9/0442; H01Q 1/48; H01Q 5/307; H01Q 5/40; H01Q 1/40
See application file for complete search history.

(56) References Cited

U.S. PATENT DOCUMENTS

2008/0278375 A1* 11/2008 Schillmeier .............. H01Q 1/40 343/700 MS
2019/0157762 A1* 5/2019 Shibata ................ H01Q 9/0407

FOREIGN PATENT DOCUMENTS

JP H02-107003 A 4/1990
JP H09-36647 A 2/1997
(Continued)

OTHER PUBLICATIONS

International Search Report and Written Opinion mailed on May 17, 2022, received for PCT Application PCT/JP2022/006144, filed on Feb. 16, 2022, 11 pages including English Translation.

*Primary Examiner* — Dieu Hien T Duong
(74) *Attorney, Agent, or Firm* — XSENSUS LLP

(57) ABSTRACT

An antenna module includes a dielectric substrate, radiating circuits disposed on the dielectric substrate, a ground electrode, and a dielectric layer. In a plan view in a direction of a normal line of the dielectric substrate, the radiating circuit is disposed adjacent to the radiating circuit. The ground electrode is disposed to face the radiating circuit and the radiating circuit. The dielectric layer is disposed to cover the radiating circuit. The radiating circuit is capable of emitting an electric wave in a frequency band higher than that for the radiating circuit. A dielectric constant of the dielectric layer is higher than a dielectric constant of the dielectric substrate. A distance between the radiating circuit and the ground electrode is shorter than a distance between the radiating circuit and the ground electrode.

14 Claims, 12 Drawing Sheets

(56) References Cited

FOREIGN PATENT DOCUMENTS

| | | | |
|---|---|---|---|
| JP | 2003-198230 | A | 7/2003 |
| JP | 2005-124056 | A | 5/2005 |
| WO | 2020/066453 | A1 | 4/2020 |
| WO | 2020/261807 | A1 | 12/2020 |

* cited by examiner

ANTENNA MODULE AND COMMUNICATION APPARATUS EQUIPPED WITH THE SAME

CROSS-REFERENCE TO RELATED APPLICATIONS

This application is a continuation application of PCT International Application No. PCT/JP2022/006144 filed on Feb. 16, 2022, designating the United States of America, which is based on and claims priority of Japanese Patent Application No. 2021-035371 filed on Mar. 5, 2021. The entire disclosures of the above-identified applications, including the specifications, drawings and claims are incorporated herein by reference in their entirety.

TECHNICAL FIELD

The present disclosure relates to an antenna module and a communication apparatus equipped with the antenna module and more specifically relates to technology for improving antenna characteristics.

BACKGROUND

Japanese Unexamined Patent Application Publication No. 2003-198230 (Patent Document 1) discloses a configuration in which multiple antenna portions each for a corresponding one of mutually different frequency bands are disposed on the same substrate. Japanese Unexamined Patent Application Publication No. 2003-198230 (Patent Document 1) also discloses the configuration in which dielectrics of different thicknesses for respective frequencies are used for the antenna portions.

CITATION LIST

Patent Document

Patent Document 1: Japanese Unexamined Patent Application Publication No. 2003-198230

SUMMARY

Technical Problems

In recent years, development of communication apparatuses supporting multiple communication standards has been promoted. Such a communication apparatus is required to transmit and receive electric waves in different frequency bands specified on a per communication standard basis and thus includes antenna devices for respective frequency bands.

Nevertheless, as recognized by the present inventor, the communication apparatus still has a great need to be downsized and made thinner, and the antenna device is also concomitantly required to be downsized and made thinner. To address this, multiple antennas for respective different frequency bands are disposed on the same substrate on occasions, as in Japanese Unexamined Patent Application Publication No. 2003-198230 (Patent Document 1). Typically, a parameter (such as a dielectric constant) appropriate for an antenna characteristic depends on the frequency band to be used. In the configuration in which the antennas for the respective different frequency bands are disposed on the same substrate, there is a case where not all of the antennas undergo optimization of parameters.

The present disclosure is made to address the issue as described above and aims to improve antenna characteristics of radiating elements for respective different frequency bands in an antenna module having the radiating elements disposed.

Solutions to Problems

An antenna module according to a first aspect of the present disclosure includes a dielectric substrate, a first radiating element, a second radiating element, a ground electrode, and a first dielectric layer, the first radiating element and the second radiating element being disposed on the dielectric substrate. In a plan view in a direction of a normal line of the dielectric substrate, the second radiating element is disposed adjacent to the first radiating element. The ground electrode is disposed to face the first radiating element and the second radiating element. The first radiating element is capable of emitting an electric wave in a first frequency band. The second radiating element is capable of emitting an electric wave in a second frequency band higher than the first frequency band. The first dielectric layer is disposed to cover the first radiating element. A dielectric constant of the first dielectric layer is higher than a dielectric constant of the dielectric substrate. A distance between the second radiating element and the ground electrode is shorter than a distance between the first radiating element and the ground electrode.

An antenna module according to a second aspect of the present disclosure includes a dielectric substrate, a first radiating element, a second radiating element, a ground electrode, and a dielectric layer, the first radiating element and the second radiating element being disposed on the dielectric substrate. In a plan view in a direction of a normal line of the dielectric substrate, the second radiating element is disposed adjacent to the first radiating element. The ground electrode is disposed to face the first radiating element and the second radiating element. The first radiating element is capable of emitting an electric wave in a first frequency band. The second radiating element is capable of emitting an electric wave in a second frequency band higher than the first frequency band. The dielectric layer is disposed to cover the first radiating element and the second radiating element. A dielectric constant of the dielectric layer is higher than a dielectric constant of the dielectric substrate. A distance between the second radiating element and the ground electrode is shorter than a distance between the first radiating element and the ground electrode.

An antenna module according to a third aspect of the present disclosure includes a dielectric substrate, a first antenna group, a second antenna group, a ground electrode, and a dielectric layer, the first antenna group and the second antenna group being disposed on the dielectric substrate. The first antenna group includes at least one first radiating element. The second antenna group includes at least one second radiating element and is disposed adjacent to the first antenna group in a plan view in a direction of a normal line of the dielectric substrate. The ground electrode is disposed to face the first antenna group and the second antenna group. The at least one first radiating element is capable of emitting an electric wave in a first frequency band. The at least one second radiating element is capable of emitting an electric wave in a second frequency band higher than the first frequency band. The dielectric layer is disposed to cover the first antenna group. A dielectric constant of the dielectric layer is higher than a dielectric constant of the dielectric substrate. A distance between the second antenna group and the ground electrode is shorter than a distance between the first antenna group and the ground electrode.

Advantageous Effects

In the antenna module according to the present disclosure, the first radiating element for lower frequencies is covered with the dielectric layer and is configured such that the distance between the second radiating element for higher frequencies and the ground electrode is shorter than the distance between the first radiating element and the ground electrode. As described above, the distance to the dielectric layer and/or the ground electrode is set in such a manner as to be appropriate for the corresponding radiating element enables antenna characteristics of radiating elements in an antenna module to be improved, the antenna module having the radiating elements for the respective different frequency bands disposed on a shared dielectric substrate.

DETAILED DESCRIPTION

Figure 1:
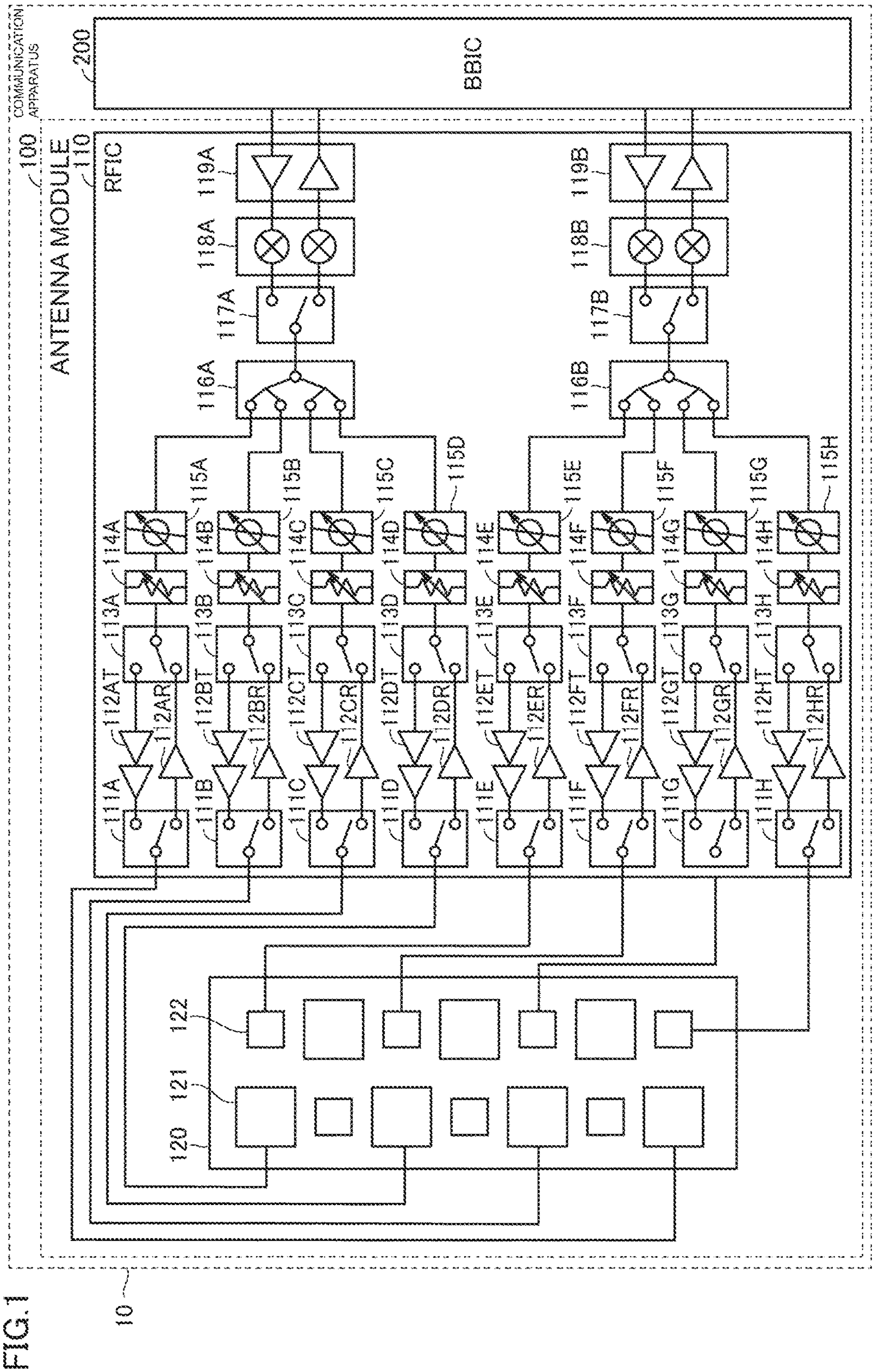
FIG. 1 is a block diagram of a communication apparatus to which an antenna module according to Embodiment 1 is applied.

Hereinafter, the present disclosure will be described in detail with reference to the drawings. The same or corresponding components are denoted by the same reference numerals, and the description thereof is not repeated.

Embodiment 1

(Basic Configuration of Communication Apparatus)

FIG. 1 is an example of a block diagram of a communication apparatus 10 to which an antenna module 100 according to Embodiment 1 is applied. For example, the communication apparatus 10 is a mobile terminal such as a mobile phone, a smartphone, or a tablet, or a personal computer having a communication function. An example of the frequency band of an electric wave used for the antenna module 100 according to this embodiment is an electric wave in a millimeter wave band having a center frequency of, for example, 28 GHz, 39 GHz, or 60 GHz; however, an electric wave in a frequency band other than the above is also applicable.

With reference to FIG. 1, the communication apparatus 10 includes the antenna module 100 and a BBIC 200 forming a baseband signal processing circuit. The antenna module 100 includes a RFIC 110 that is an example of a feed circuit and an antenna device 120. The communication apparatus 10 upconverts a signal transmitted from the BBIC 200 to the antenna module 100 into a radio-frequency signal by using the RFIC 110 and emits the signal from the antenna device 120. The communication apparatus 10 also transmits the radio-frequency signal received by the antenna device 120 to the RFIC 110 and downconverts the signal by using the BBIC 200. As used in this specification the term "module", as used with "antenna module" should be construed as circuitry (programmable, as well as discrete) and associated circuit components, such as circuit boards, etc.

The antenna module 100 is an antenna module of what is called a dual band type that is capable of emitting electric waves in different two frequency bands. The antenna device 120 includes multiple radiating elements 121 that emit electric waves with lower frequencies and multiple radiating elements 122 that emit electric waves with higher frequencies.

For easy explanation, FIG. 1 illustrates the configuration of the RFIC 110 having component groups each corresponding to four radiating elements of the multiple radiating elements (feed elements) 121 and 122 constituting the antenna device 120 and omits the configuration of the other radiating elements having the same configuration. FIG. 1 illustrates an example in which the antenna device 120 is composed of the multiple radiating elements 121 and 122 disposed in a two-dimensional array, but a one-dimensional array in which multiple radiating elements 121 and 122 are disposed in line may also be used. The antenna device 120 may also have a configuration in which one radiating element 121 and one radiating element 122 are provided. In this embodiment, the radiating elements 121 and 122 are both a plate-shaped patch antenna.

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, a signal multiplexer/demultiplexer 116A, a signal multiplexer/demultiplexer 116B, mixers 118A and 118B, and amplifier circuits 119A and 119B. Of these components, the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A form a circuit for each radiating element 121 for the lower frequencies. The switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B form a circuit for each radiating element 122 for the higher frequencies.

In a case where a radio-frequency signal is transmitted, the switches 111A to 111H and 113A to 113H are switched over to the power amplifiers 112AT to 112HT, and the switches 117A and 117B are connected to amplifiers on the transmission side in the amplifier circuits 119A and 119B. In a case where the radio-frequency signal is received, the switches 111A to 111H and 113A to 113H are switched over to the low-noise amplifiers 112AR to 112HR, and the switches 117A and 117B are connected to amplifiers on the reception side in the amplifier circuits 119A and 119B.

Signals transmitted from the BBIC 200 are amplified by the amplifier circuits 119A and 119B and upconverted by the mixers 118A and 118B. The transmission signals that are upconverted radio-frequency signals are demultiplexed into four signals by the signal multiplexer/demultiplexer 116A and the signal multiplexer/demultiplexer 116B and supplied to the radiating elements 121 and 122 via respective signal paths. At this time, the phase degrees of the respective phase shifters 115A to 115H disposed on the signal paths are controlled individually, and the directivity of the antenna device 120 can thereby be controlled.

Reception signals that are radio-frequency signals received by the respective radiating elements 121 and 122 are transmitted to the RFIC 110 and multiplexed by the signal multiplexer/demultiplexer 116A and the signal multiplexer/demultiplexer 116B via four respective different signal paths. The multiplexed reception signals are down-converted by the mixers 118A and 118B, amplified by the amplifier circuits 119A and 119B, and transmitted to the BBIC 200.

(Antenna Module Structure)

Figure 2:
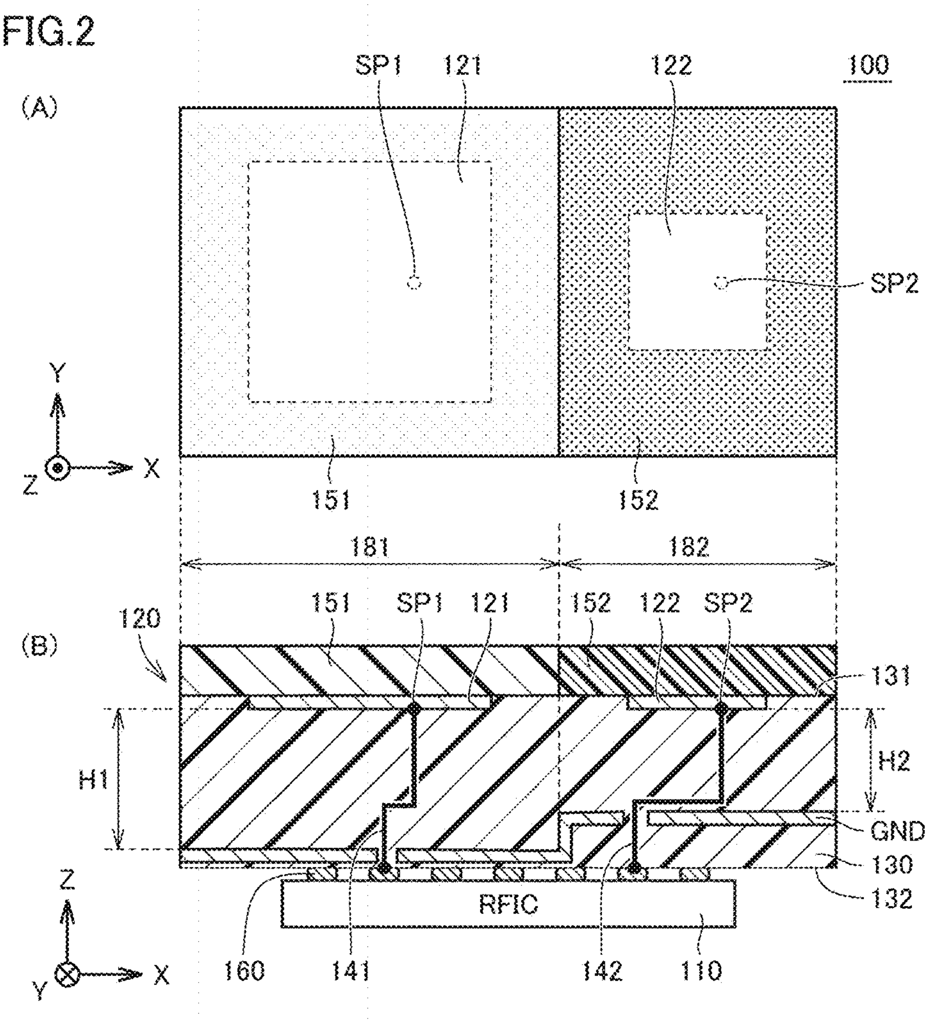
FIG. 2 is a plan view of the antenna module in FIG. 1 and is also a side perspective view thereof.

Details of the configuration of the antenna module 100 in Embodiment 1 will then be described by using FIG. 2. FIG. 2 is a view illustrating the antenna module 100 according to Embodiment 1. FIG. 2 illustrates a plan view of the antenna module 100 (FIG. 2(A)) in an upper part and a side perspective view (FIG. 2(B)) in a lower part. For easy explanation, a case where one radiating element 121 and one radiating element 122 are illustrated in FIG. 2 is described as an example.

The antenna module 100 includes a dielectric substrate 130, feed wiring lines 141 and 142, dielectric layers 151 and 152, and a ground electrode GND in addition to the radiating elements 121 and 122 and the RFIC 110. In the following description, a direction of a normal line of the dielectric substrate 130 (an emission direction of an electric wave) is a Z axis direction. On a surface perpendicular to the Z axis direction, a direction in which the radiating elements 121 and 122 are disposed is defined as an X axis, and a direction orthogonal to the X axis is defined as a Y axis. A positive direction and a negative direction along the Z axis in the drawings are respectively referred to as an upper side and a lower side on occasions.

The dielectric substrate 130 is, for example, a low-temperature co-fired ceramic (LTCC) multi-layer substrate, a multi-layer resin substrate formed by laminating multiple resin layers formed from resin such as epoxy or polyimide, a multi-layer resin substrate formed by laminating multiple resin layers formed from liquid crystal polymer (LCP) having a lower dielectric constant, a multi-layer resin substrate formed by laminating multiple resin layers formed from fluorine-based resin, a multi-layer resin substrate formed by laminating multiple resin layers formed from a PET (Polyethylene Terephthalate) material, or a ceramic multi-layer substrate other than the LTCC. In one aspect, the dielectric substrate 130 is a single-layer substrate.

In the plan view in the normal line direction (Z axis direction), the dielectric substrate 130 has a rectangular shape. The radiating elements 121 and 122 are disposed adjacent to each other in the X-axis direction in a layer (a layer on the upper side) close to an upper surface 131 (a surface in the positive direction along the Z axis) of the dielectric substrate 130. The radiating elements 121 and 122 may be disposed in such a manner as to be exposed from the surface of the dielectric substrate 130 and may be disposed inside the dielectric substrate 130.

Each of the radiating elements 121 and 122 is a rectangular plate-shaped electrode. The size of the radiating element 122 is smaller than the size of the radiating element 121, and the resonant frequency of the radiating element 122 is higher than the resonant frequency of the radiating element 121. The frequency band of the electric wave emitted from the radiating element 122 (a second frequency band) is higher than the frequency band of the electric wave emitted from the radiating element 121 (a first frequency band). A radio-frequency signal is supplied from the RFIC 110 to each of the radiating elements 121 and 122 via a corresponding one of the feed wiring lines 141 and 142.

The feed wiring line 141 penetrates through the ground electrode GND from the RFIC 110 and is connected to a feed point SP1 of the radiating element 121. The feed wiring line 142 penetrates through the ground electrode GND from the RFIC 110 and is connected to a feed point SP2 of the radiating element 122. The feed point SP1 is shifted from the center of the radiating element 121 in the positive direction along the X axis, and the feed point SP2 is shifted from the center of the radiating element 122 in the positive direction along the X axis. An electric wave is thereby emitted from each of the radiating elements 121 and 122 in the X-axis direction serving as a polarization direction.

The ground electrode GND is disposed in a location near a lower surface 132 of the dielectric substrate 130 to extend over the entire dielectric substrate 130. In FIG. 2, the ground electrode GND in a region (a second portion) 182 facing the radiating element 122 is disposed closer to the upper surface 131 than the ground electrode GND in a region (a first portion) 181 facing the radiating element 121 is. A distance H2 between the radiating element 122 and the ground electrode GND is thus shorter than a distance H1 between the radiating element 121 and the ground electrode GND (H1>H2). FIG. 2 illustrates an example of a configuration in which the first portion 181 and the second portion 182 in the dielectric substrate 130 have the same substrate thickness; however, the substrate thickness of the second portion 182 may be set lower than that of the first portion 181 to conform to the distance H2 described above to the ground electrode GND.

The RFIC 110 is mounted on the lower surface 132 of the dielectric substrate 130 with solder bumps 160 interposed therebetween. The RFIC 110 may be connected to the dielectric substrate 130 by using multipole connectors, instead of the soldering connection.

The dielectric layer 151 is disposed in a region covering the radiating element 121 on the upper surface 131 of the dielectric substrate 130, and the dielectric layer 152 is disposed in the region covering the radiating element 122. In addition, the dielectric layer 151 and the dielectric layer 152 are in contact with each other on the upper surface 131 of the dielectric substrate 130. Each of the dielectric constants of the respective dielectric layers 151 and 152 is higher than the dielectric constant of the dielectric substrate 130, and further, a dielectric constant ε1 of the dielectric layer 151 is higher than a dielectric constant ε2 of the dielectric layer 152 (ε1>ε2). In Embodiment 1, the thickness of the dielectric layer 151 is almost equal to the thickness of the dielectric layer 152.

Typically, in the plate-shaped patch antenna, as a Q value determined from a ratio between radiant power and accumulated power due to a radiating element and a ground electrode becomes lower, a frequency bandwidth tends to be increased. For example, in a case that a distance between the radiating element and the ground electrode is made longer, or in a case that a dielectric constant between the radiating element and the ground electrode is lowered, the Q value is lowered, and thus the frequency bandwidth is increased.

In a case that the top part of the radiating element is covered with a dielectric layer having a higher dielectric constant than that of a dielectric substrate, a surface acoustic wave generated from the radiating element tends to be stronger, and a line of electric force generated from an end portion of the radiating element in a direction along an electrode surface extends farther than in a case without a dielectric layer having the higher dielectric constant. In this case, a longer path length of the line of electric force from the radiating element to the ground electrode consequently leads to a state equivalent to the longer distance between the radiating element and the ground electrode. Accordingly, covering the top part of the radiating electrode with the dielectric layer having the high dielectric constant leads to a lower Q value of the patch antenna and consequently to an increased frequency bandwidth.

The higher the dielectric constant of the dielectric layer, the higher the influence of the dielectric layer on the surface acoustic wave. Accordingly, the higher the dielectric constant, the greater the increase effect of the frequency bandwidth. However, since the path length of the line of electric force is increased, resonance in unwanted mode on the contrary occurs easily. The increase in the frequency bandwidth and occurrence of the resonance in the unwanted mode thus have a tradeoff relationship.

The dielectric layer tends to influence the surface acoustic wave more sensitively as the frequency of the electric wave emitted from the radiating element becomes higher. Accordingly, in a case that dielectric layers have the same thickness, the dielectric constant is required to be lowered as the frequency of the emitted electric wave becomes higher.

In a case that the radiating elements for the different frequency bands are disposed on the shared dielectric substrate as in the antenna module of this Embodiment 1, dimensional or manufacturing restriction sometimes prevents the material and the dimensions of the dielectric substrate from being in a suitable state for both of the radiating elements.

For example, in a case that the dielectric constant of a dielectric substrate is set as a dielectric constant suitable for a radiating element for lower frequencies, a radiating element for higher frequencies possibly has an excessively high dielectric constant. This possibly prevents the frequency bandwidth from being sufficiently ensured or causes the wavelength decrease effect to cause resonance in the unwanted mode to occur easily. In contrast, in a case that the dielectric constant of the dielectric substrate is set as a dielectric constant suitable for the radiating element for the higher frequencies, the radiating element for the lower frequencies has a dielectric constant lower than a dielectric constant suitable for the thickness of the dielectric substrate. Accordingly, making the dielectric substrate thicker is required and thus possibly causes the antenna module to be prevented from being downsized.

In the antenna module 100 of Embodiment 1, the radiating elements 121 and 122 are disposed on the shared dielectric substrate 130, but the dielectric layers having the dielectric constants for the respective radiating elements are disposed individually on the dielectric substrate 130. The intensity of the surface acoustic wave of each of the radiating elements 121 and 122 can thereby be controlled individually, and thus the frequency bandwidth of both of the respective radiating elements 121 and 122 disposed even on the shared dielectric substrate 130 can be appropriately increased. Further, in the antenna module 100, the distance between each radiating element and the ground electrode GND is set such that the distance from the radiating element 122 for the higher frequencies is shorter than the distance from the radiating element 121 for the lower frequencies. The configuration as described above can prevent resonance in the unwanted mode easily occurring in the radiating element 122 for the higher frequencies.

As described above, the distance to the ground electrode and the dielectric constant of the dielectric layer can be set individually for each radiating element in the antenna module 100 of Embodiment 1. Accordingly, even in the configuration in which the radiating elements for the different frequency bands are disposed on the shared dielectric substrate, the antenna characteristics of the radiating elements can be improved.

(Modification 1)

The configuration in which the distance between each radiating element and the ground electrode is controlled by changing the location of the ground electrode in the dielectric substrate on the basis of the radiating element has been described for Embodiment 1.

For Modification 1, a configuration in which the ground electrode is disposed on one layer of the dielectric substrate and the distance between each radiating element and the ground electrode is controlled by making the locations of the radiating element different will be described.

Figure 3:
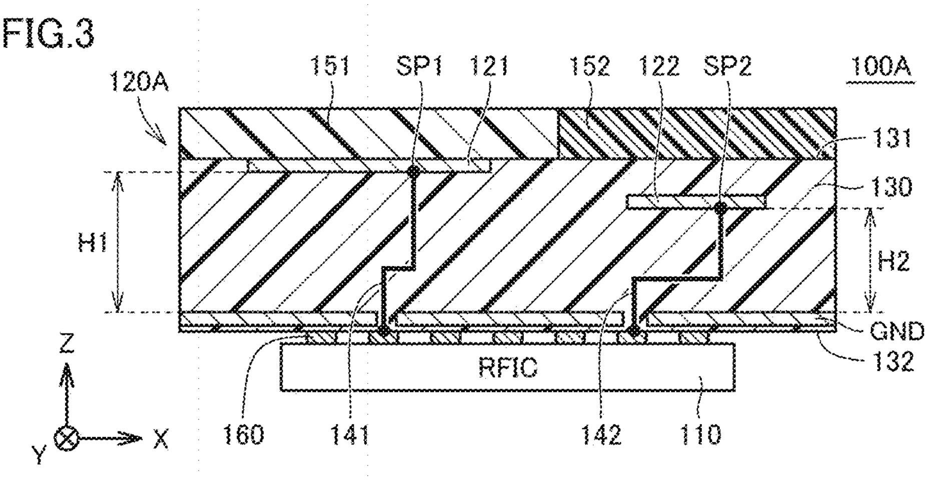
FIG. 3 is a side perspective view of an antenna module of Modification 1.

FIG. 3 is a side perspective view of an antenna module 100A of Modification 1. With reference to FIG. 3, in an antenna element 120A of the antenna module 100A, the ground electrode GND in the region (first portion) facing the radiating element 121 and the ground electrode GND in the region (second portion) facing the radiating element 122 is formed in the same layer. In contrast, the radiating element 122 is formed in a layer closer to the lower surface 132 than that for the radiating element 121. The distance H2 between the radiating element 122 and the ground electrode GND is thereby shorter than the distance H1 between the radiating element 121 and the ground electrode GND.

In the antenna module 100A, part of the dielectric substrate 130 in addition to the dielectric layer 152 is disposed on the emission surface side of the radiating element 122, and thus total dielectric thickness above the radiating element 122 is higher than that of the antenna module 100. Accordingly, to achieve the same dielectric constant as that of the dielectric layer 152 in Embodiment 1, the dielectric constant of the dielectric layer 152 in Modification 1 is required to be set lower than that in Embodiment 1.

As described above, since the distance between each radiating element and the ground electrode and the dielectric constant of each dielectric layer are set individually also in the antenna module 100A of Modification 1, the antenna characteristics of the radiating elements can be improved even in the configuration in which the radiating elements for the different frequency bands are disposed on the shared dielectric substrate.

(Array Antenna)

Figure 4:
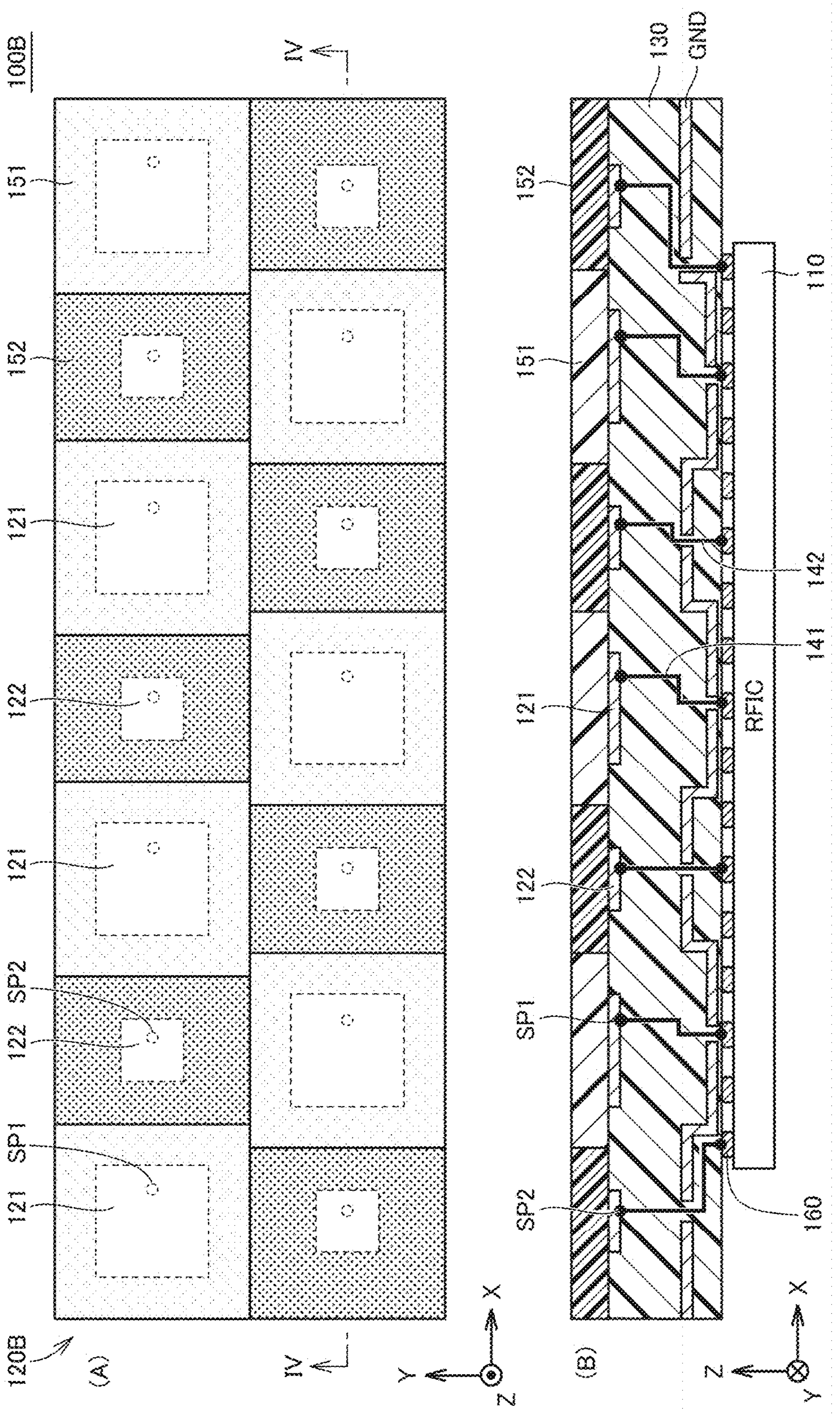
FIG. 4 is a plan view of a first example of an array antenna and is also a side perspective view thereof.
Figure 5:
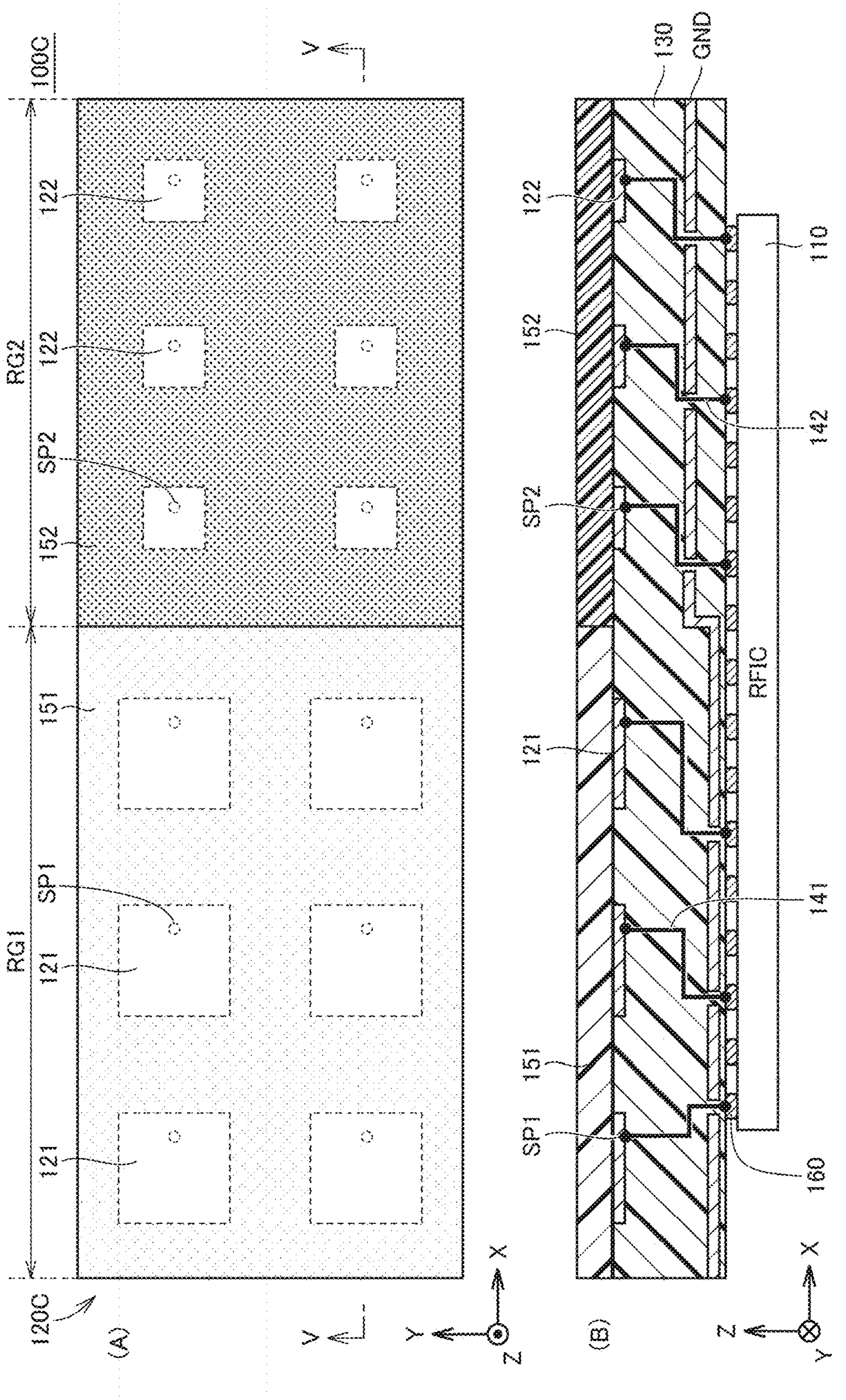
FIG. 5 is a plan view of a second example of the array antenna and is also a side perspective view thereof.

FIG. 4 and FIG. 5 are each a view illustrating an example in which the antenna module described for Embodiment 1 or Modification 1 is formed into an array as in FIG. 1.

FIG. 4 is a view for explaining an antenna module 100B formed into an array as a first example. An upper part of FIG. 4 (FIG. 4(A)) is a plan view of the antenna module 100B, and a lower part (FIG. 4(B)) is a cross-sectional view taken along the line IV-IV in the plan view. In an antenna device 120B of the antenna module 100B, the radiating elements

121 and 122 are disposed alternately in the X-axis direction and the Y-axis direction and are formed into the array. More specifically, each of the four radiating elements 121 and each of the three radiating elements 122 are disposed alternately in the first row in FIG. 4, and each of the three radiating elements 121 and each of the four radiating elements 122 are disposed alternately in the second row.

The dielectric layer 151 is disposed on the top part of the radiating element 121, and the dielectric layer 152 is disposed on the top part of the radiating element 122. For easy explanation, in FIG. 4 and FIG. 5 (described later), the hatching of the dielectric layers 151 and 152 is omitted in portions overlapping with the radiating elements 121 and 122.

FIG. 5 is a view for explaining an antenna module 100C formed into an array as a second example. An upper part of FIG. 5 (FIG. 5(A)) is a plan view of the antenna module 100C, and a lower part (FIG. 5(B)) is a cross-sectional view taken along the line V-V in the plan view. In an antenna device 120C of the antenna module 100C, the six radiating elements 121 are arranged two-dimensionally in a region RG1 in the dielectric substrate 130 in the negative direction along the X axis, and the six radiating elements 122 are disposed in a region RG2 in the dielectric substrate 130 in the positive direction along the X axis.

The six radiating elements 121 are covered with the dielectric layer 151 in the region RG1, and the six radiating elements 122 are covered with the dielectric layer 152 in the region RG2. The six radiating elements 121 and the six radiating elements 122 in the second example respectively correspond to a first antenna group and a second antenna group in the present disclosure.

In the antenna modules 100B and 100C, as in the antenna modules 100 and 100A, the distance between the radiating element 122 for the higher frequencies and the ground electrode GND is set shorter than the distance between the radiating element 121 for the lower frequencies and the ground electrode GND.

As described above, the radiating elements are covered with the dielectric layers appropriate for the respective radiating elements also in the array antenna, and further the distance between each radiating element and the ground electrode is set individually for the radiating element. Accordingly, even in the configuration in which the radiating elements for the different frequency bands are disposed on the shared dielectric substrate, the antenna characteristics of the radiating elements can be improved.

Embodiment 2

For Embodiment 1, the case where the dielectric layer for the radiating element for the lower frequencies and the dielectric layer for the radiating element for the higher frequencies have the same thickness has been described. For Embodiment 2, a configuration in which the dielectric layers for the respective radiating elements have different thicknesses will be described.

Figure 6:
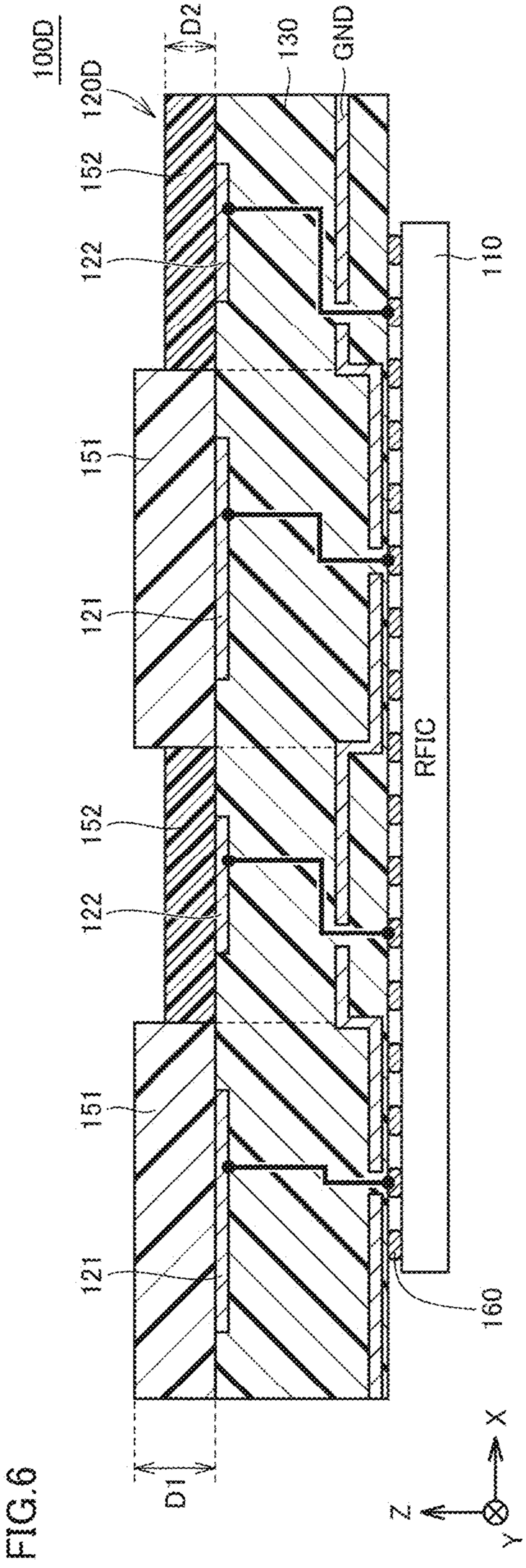
FIG. 6 is a side perspective view of an antenna module according to Embodiment 2.

FIG. 6 is a side perspective view of an antenna module 100D according to Embodiment 2. The configuration of an antenna element 120D in the antenna module 100D is basically similar to the configuration of the antenna module 100B described with reference to FIG. 4; however, the dielectric layers 151 and 152 disposed on the dielectric substrate 130 have different thicknesses. More specifically, a thickness D1 of the dielectric layer 151 for the lower frequencies is set lower than a thickness D2 of the dielectric layer 152 for the higher frequencies (D1>D2).

As described above, in the case where the dielectric layers are disposed on the emission surface side of the radiating elements, the dielectric layer for the higher frequencies has a more sensitive influence on the frequency bandwidth, and thus the dielectric constant $\varepsilon 2$ of the dielectric layer 152 for the higher frequencies is, in one aspect, set lower than the dielectric constant $\varepsilon 1$ of the dielectric layer 151 for the lower frequencies ($\varepsilon 1>\varepsilon 2$). Accordingly, for example, in a case that the same material is used for the dielectric layers 151 and 152, the dielectric constants appropriate for the respective radiating elements can be achieved by setting the thickness D2 of the dielectric layer 152 lower than the thickness D1 of the dielectric layer 151.

In addition, the wavelength of an electric wave with a higher frequency is shorter than the wavelength of an electric wave with a lower frequency. Accordingly, the same thickness of the dielectric layers leads to an increase in resonance in the unwanted mode in the dielectric layer for the higher frequencies. Accordingly, resonance in the unwanted mode in the dielectric layer 152 can be prevented by setting the thickness D2 of the dielectric layer 152 for the higher frequencies lower than the thickness D1 of the dielectric layer 151.

In particular, the wavelength decrease effect on the dielectric layer 152 becomes higher as the dielectric constant $\varepsilon 2$ of the dielectric layer 152 becomes higher, and thus unwanted resonance in a higher-order mode occurs more easily. Accordingly, in one aspect, the thickness D2 of the dielectric layer 152 is set lower as the dielectric constant $\varepsilon 2$ of the dielectric layer 152 becomes higher. The thickness D2 of the dielectric layer 152 may be zero.

Embodiment 3

For Embodiment 3, a configuration for preventing unwanted resonant mode propagation in the radiating elements will be described.

Figure 7:
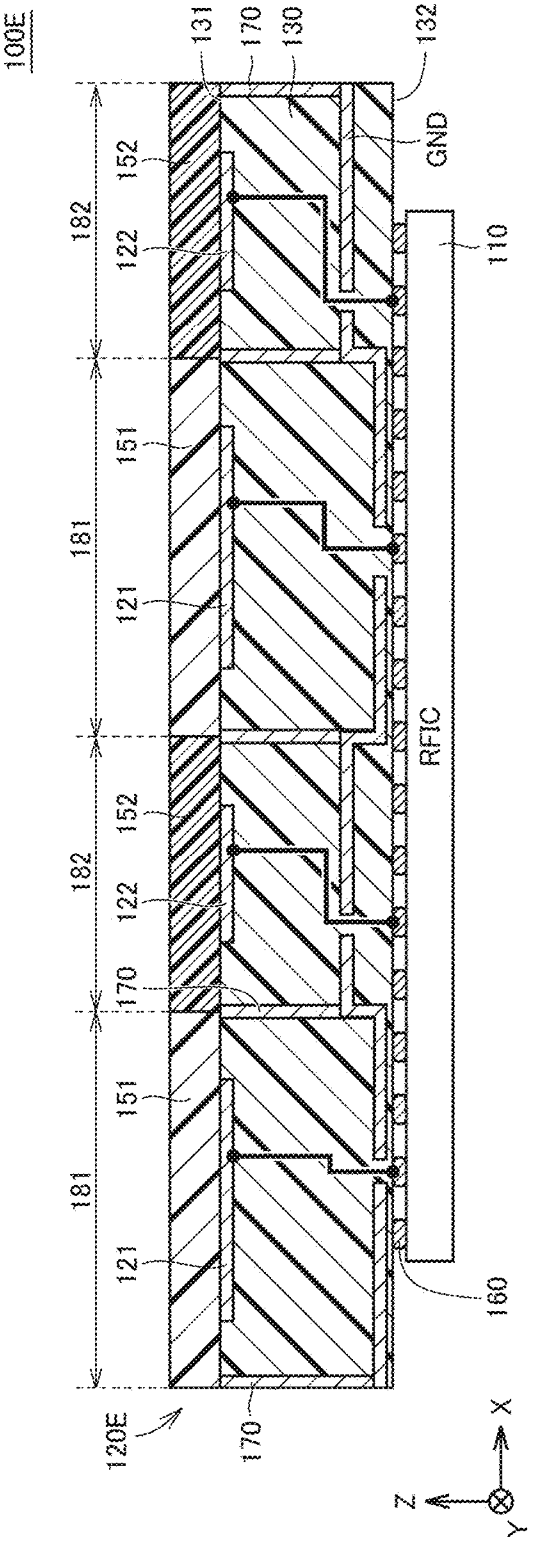
FIG. 7 is a side perspective view of an antenna module according to Embodiment 3.

FIG. 7 is a side perspective view of an antenna module 100E according to Embodiment 3. In an antenna element 120E of the antenna module 100E, shielding members 170 each electrically connected to the ground electrode GND are disposed between a corresponding one of the first portions 181 facing the corresponding radiating element 121 in the dielectric substrate 130 and a corresponding one of the second portions 182 facing the corresponding radiating element 122.

Each shielding member 170 is a wall-shaped member formed from an electric conductor such as copper. In the example in FIG. 7, the shielding member 170 extends from the ground electrode GND to the upper surface 131 of the dielectric substrate 130. The shielding member 170 functions to block an electric wave in the unwanted resonant mode occurring from the adjacent radiating element. Disposing the shielding member 170 thus enables reduction in noise attributed to the electric wave in the unwanted resonant mode propagating to the adjacent radiating element.

In one aspect, the shielding member 170 is disposed at each of borders between the first portion 181 and the second portion 182; however, a configuration in which the shielding member 170 is disposed in only part of the borders may be employed. In the case where the shielding member 170 is partially disposed, the shielding member 170 is disposed at the border orthogonal to the polarization direction of the radiating elements with priority.

The shape of the shielding member 170 is not limited to the wall shape, and the shielding members 170 may be formed from, for example, multiple columnar vias disposed spaced away from each other, wire members each formed in multiple dielectric layers, or mesh members. Further, to prevent the unwanted resonant mode from leaking to the outside of the antenna module, each shielding member 170 may be formed along a side surface of the dielectric substrate 130.

In a case that the radiating elements of the same size are disposed collectively like the antenna module 100C described with reference to FIG. 5, the shielding member 170 may be formed between the radiating element 121 and the radiating element 121 and/or between the radiating element 122 and the radiating element 122.

Embodiment 4

For the antenna modules in Embodiments 1 to 3, the configuration in which the radiating elements emit electric waves in one polarization direction has been described. For each of Embodiment 4 and Embodiments 5 and 6 (described later), a configuration in which the features of the present disclosure is applied to an antenna module of what is called a dual polarization type that is capable of emitting electric waves in two different polarization directions will be described.

Figure 8:
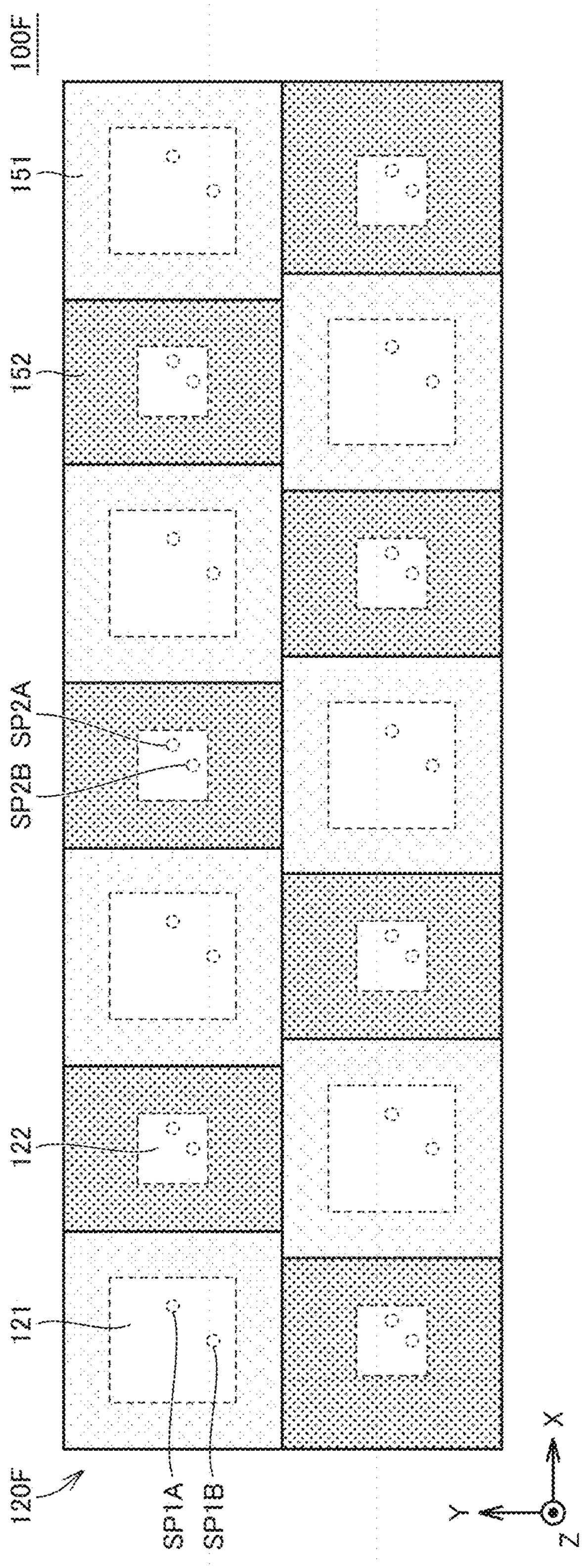
FIG. 8 is a plan view of an antenna module according to Embodiment 4.

FIG. 8 is a plan view of an antenna module 100F according to Embodiment 4. With reference to FIG. 8, like the antenna module 100B in FIG. 4, an antenna device 120F of the antenna module 100F is an array antenna in which each radiating element 121 and each radiating element 122 are disposed alternately adjacent to each other. In the antenna module 100F, each of the radiating elements 121 and 122 is provided with two feed points.

More specifically, in the radiating element 121, a feed point SP1A is disposed at a position shifted from the center of the electrode in the positive direction along the X axis, and a feed point SP1B is disposed at a position shifted from the center of the electrode in the negative direction along the Y axis. A radio-frequency signal is supplied to the feed point SP1A, and thereby an electric wave is emitted from the radiating element 121 in the X-axis direction serving as a polarization direction. In contrast, a radio-frequency signal is supplied to the feed point SP1B, and thereby an electric wave is emitted from the radiating element 121 in the Y-axis direction serving as a polarization direction.

Likewise, in the radiating element 122, a feed point SP2A is disposed at a position shifted from the center of the electrode in the positive direction along the X axis, and a feed point SP2B is disposed at a position shifted from the center of the electrode in the negative direction along the Y axis. A radio-frequency signal is supplied to the feed point SP2A, and thereby an electric wave is emitted from the radiating element 122 in the X-axis direction serving as a polarization direction. In contrast, a radio-frequency signal is supplied to the feed point SP2B, and thereby an electric wave is emitted from the radiating element 122 in the Y-axis direction serving as a polarization direction.

In the antenna module 100F of Embodiment 4, in each radiating element, the two feed points are supplied with identical radio-frequency signals at different timings or the same timing.

Also in the antenna module 100F of the dual polarization type as described above, the antenna characteristics can be improved by disposing the dielectric layers appropriately for the radiating elements 121 and 122 and by making the distance between the radiating element 122 for the higher frequencies and the ground electrode GND shorter than the distance between the radiating element 121 for the lower frequencies and the ground electrode GND.

Embodiment 5

Figure 9:
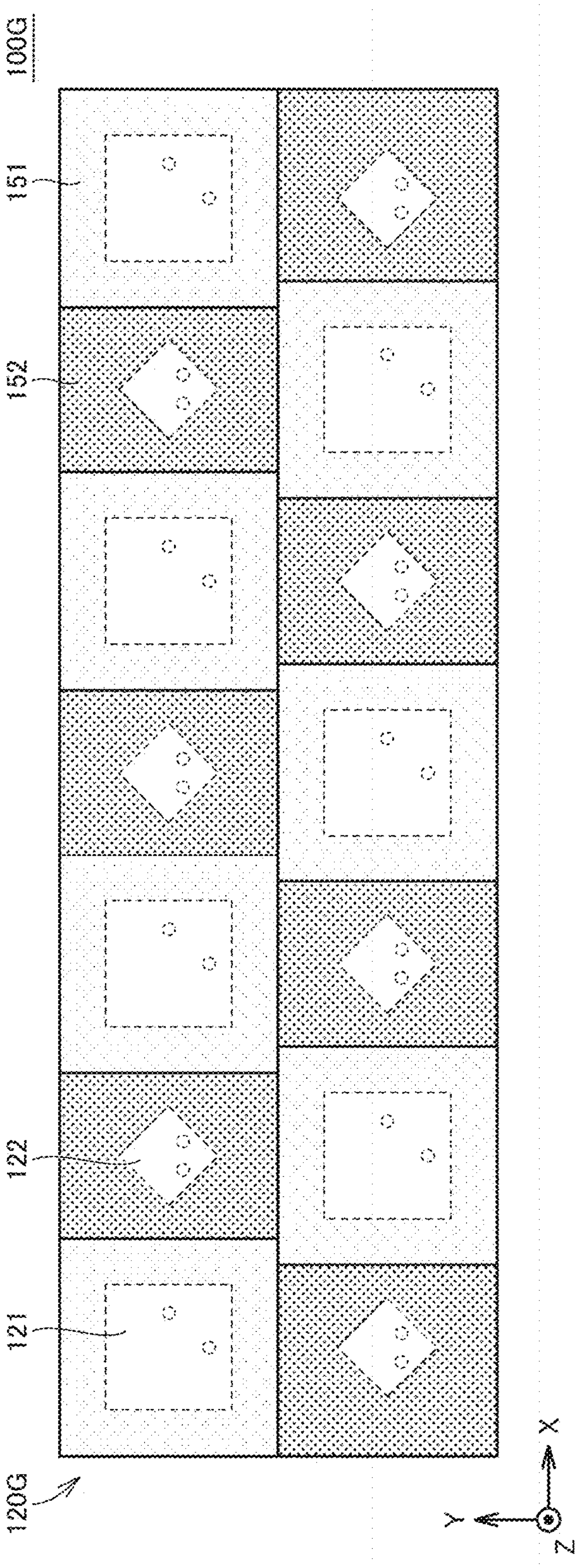
FIG. 9 is a plan view of an antenna module according to Embodiment 5.

FIG. 9 is a plan view of an antenna module 100G according to Embodiment 5. With reference to FIG. 9, like the antenna module 100F in FIG. 8, in an antenna device 120G of the antenna module 100G, each radiating element 121 is disposed in such a manner that sides of the radiating element 121 extend along the X axis or the Y axis and is configured to be capable of emitting an electric wave in the X-axis direction as a polarization direction and an electric wave in the Y-axis direction as a polarization direction.

In contrast, in each radiating element 122, each of the sides thereof is disposed in such a manner as to be inclined with respect to the corresponding side of the radiating element 121. In other words, the antenna module 100G has a configuration in which the radiating element 122 in the antenna module 100F in FIG. 8 is rotated about the center of the electrode. In the example in FIG. 9, the radiating element 122 has an inclination angle of 45 degrees and emits an electric wave in a direction, as a polarization direction, inclined at an angle of 45 degrees with respect to the polarization direction of the electric wave emitted from the radiating element 121. The inclination angle of the radiating element 122 is not limited to 45 degrees and may be any angle in a range from greater than zero degrees to less than 45 degrees.

Particularly, in a case that the size of the ground electrode GND relative to each radiating element is limited, inclining the radiating element as described above enables a longer distance from an end portion of the radiating element to an end portion of the dielectric substrate in the polarization direction. The frequency bandwidth of the emitted electric wave can thereby be made wider. In addition, since the polarization direction of the electric wave emitted from the radiating element 121 is different from the polarization direction of the electric wave emitted from the radiating element 122, isolation between the electric waves emitted from the radiating elements can be improved.

In the example in FIG. 9, the example in which the radiating element 122 for the higher frequencies is inclined has been described; however, instead of this, the radiating element 121 for the lower frequencies may be inclined. Alternatively, both of the radiating element 121 and the radiating element 122 may be disposed in an inclined manner.

Also in the antenna module having the radiating elements disposed in the above manner, the antenna characteristics can be improved by disposing the dielectric layers appropriately for the radiating elements 121 and 122 and by making the distance between the radiating element 122 for the higher frequencies and the ground electrode GND shorter than the distance between the radiating element 121 for the lower frequencies and the ground electrode GND.

Embodiment 6

For Embodiment 6, a configuration in which respective electric waves of different radio-frequency signals are emitted from each radiating element in respective polarization directions will be described.

Figure 10:
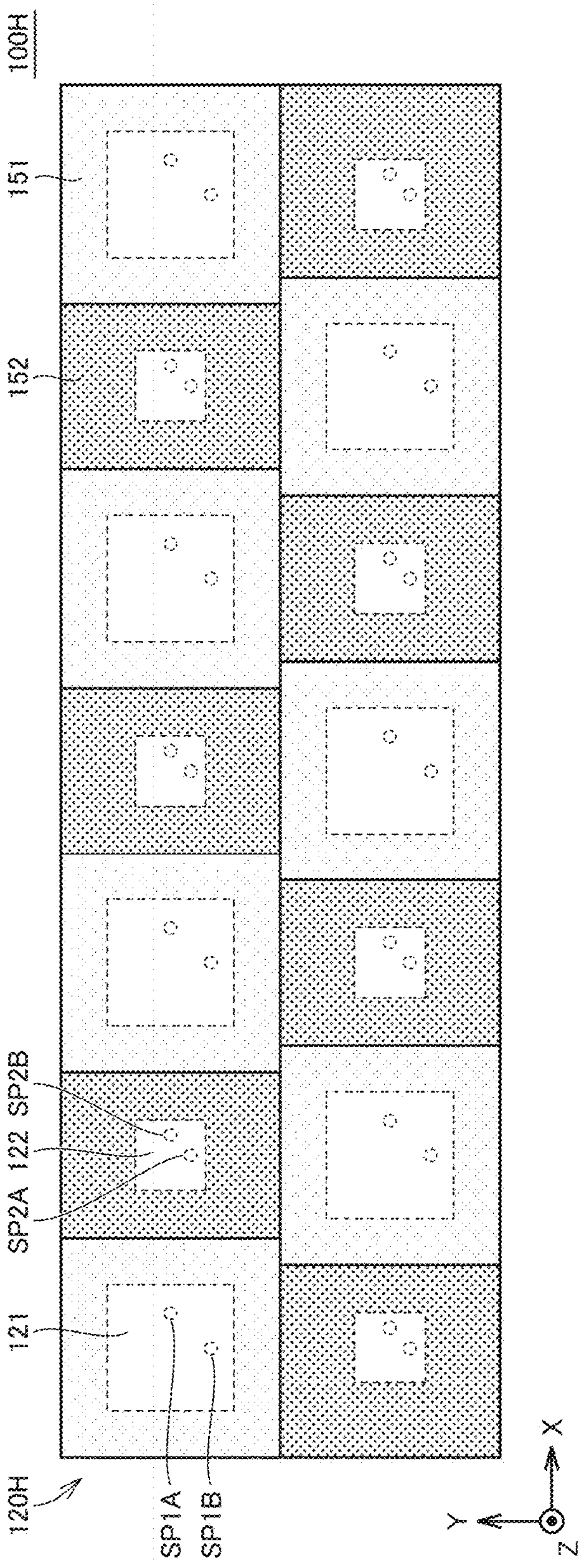
FIG. 10 is a plan view of an antenna module according to Embodiment 6.

FIG. 10 is a plan view of an antenna module 100H according to Embodiment 6. With reference to FIG. 10, an antenna device 120H of the antenna module 100H has basically the same configuration as that of the antenna device 120F of the antenna module 100F in FIG. 8. However, in the radiating element 122 for the higher frequencies, the feed point SP2A is disposed at a position shifted from the center of the electrode in the negative direction along the Y axis, and the feed point SP2B is disposed at a position shifted from the center of the electrode in the positive direction along the X axis.

In the antenna module 100H, the feed point SP1A in the radiating element 121 is supplied with a first signal, and the feed point SP1B is supplied with a second signal for indication different from the first signal. Electric waves of the mutually different indication signals are thus emitted from the one radiating element in respective different polarization directions.

Also in the radiating element 122, the feed point SP2A is supplied with a first signal, and the feed point SP1B is supplied with a second signal. The radiating elements 121 and 122 thus emit the electric waves of the first signal and the second signal at different frequencies.

At this time, the polarization direction of the electric wave of the first signal emitted from the radiating element 121 is the X-axis direction, and the polarization direction of the electric wave of the first signal emitted from the radiating element 122 is the Y-axis direction. Likewise, the polarization direction of the electric wave of the second signal emitted from the radiating element 121 is the Y-axis direction, and the polarization direction of the electric wave of the second signal emitted from the radiating element 122 is the X-axis direction.

Isolation between the signals emitted from the radiating elements can be improved by emitting the same indication signals from the two radiating elements for mutually different frequency bands by using the electric waves in the polarization directions orthogonal to each other, as described above.

Also in the antenna module having the configuration as described above, the antenna characteristics can be improved by disposing the dielectric layers appropriately for the radiating elements 121 and 122 and by making the distance between the radiating element 122 for the higher frequencies and the ground electrode GND shorter than the distance between the radiating element 121 for the lower frequencies and the ground electrode GND.

Embodiment 7

For each antenna module described above in the corresponding embodiment described above, the configuration in which the dielectric layers having the different dielectric constants are disposed for the radiating element 121 and the radiating element 122 has been described. For Embodiment 7, a configuration in which a shared dielectric layer is disposed on the radiating elements 121 and 122 will be described.

Figure 11:
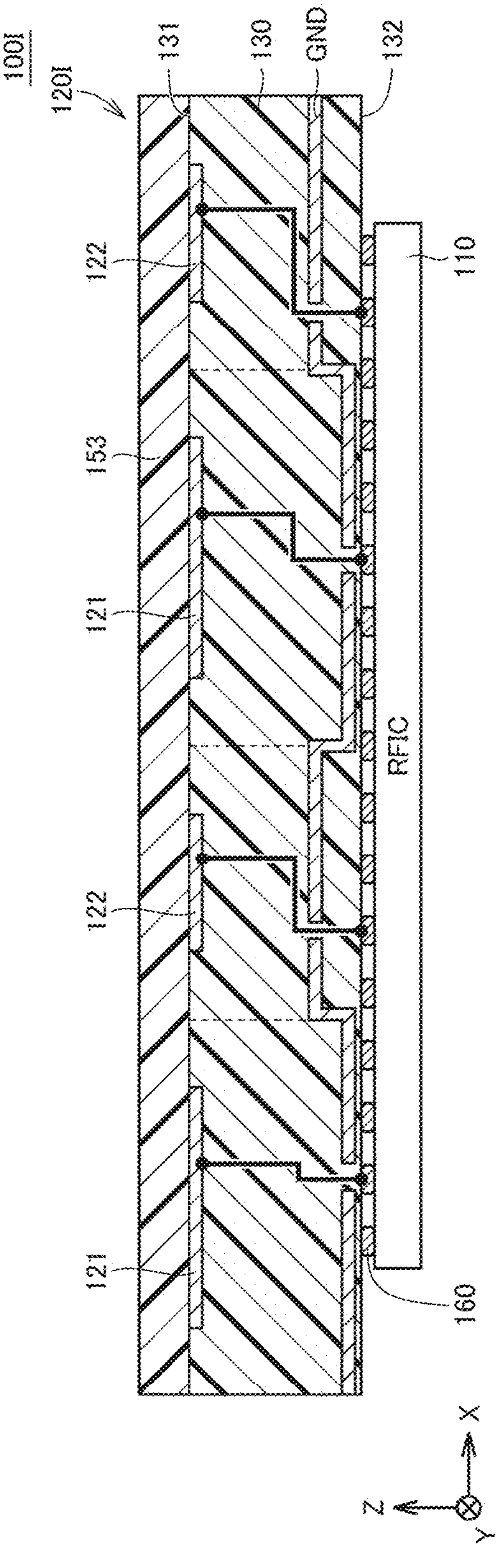
FIG. 11 is a side perspective view of an antenna module according to Embodiment 7.

FIG. 11 is a side perspective view of an antenna module 100I according to Embodiment 7. With reference to FIG. 11, like Embodiments 1 to 6 described above, in an antenna device 120I of the antenna module 100I, the distance between the radiating element 122 and the ground electrode GND is shorter than the distance between the radiating element 121 and the ground electrode GND, but a shared dielectric layer 153 is disposed on the radiating elements 121 and 122.

As described above, one of the radiating elements that is provided for the higher frequencies is influenced more sensitively by the dielectric layer disposed on the radiating elements. Accordingly, the dielectric constant of the dielectric layer 153 is substantially set at a dielectric constant suitable for the radiating element 122 for the higher frequencies.

In the configuration as described above, it is not possible to sufficiently improve one of the frequency bandwidths in the radiating elements 121 and 122, but the distance between each radiating element and the ground electrode GND can be controlled on the basis of the radiating element. Resonance in the unwanted mode in the radiating element 122 for the higher frequencies can thus be prevented.

Embodiment 8

For each antenna module in the corresponding embodiment described above, the configuration in which the radiating elements 121 and 122 disposed on the dielectric substrate 130 are both the plate-shaped patch antenna has been described. For Embodiment 8, a configuration in which the radiating element for the lower frequencies is a dipole antenna will be described.

Figure 12:
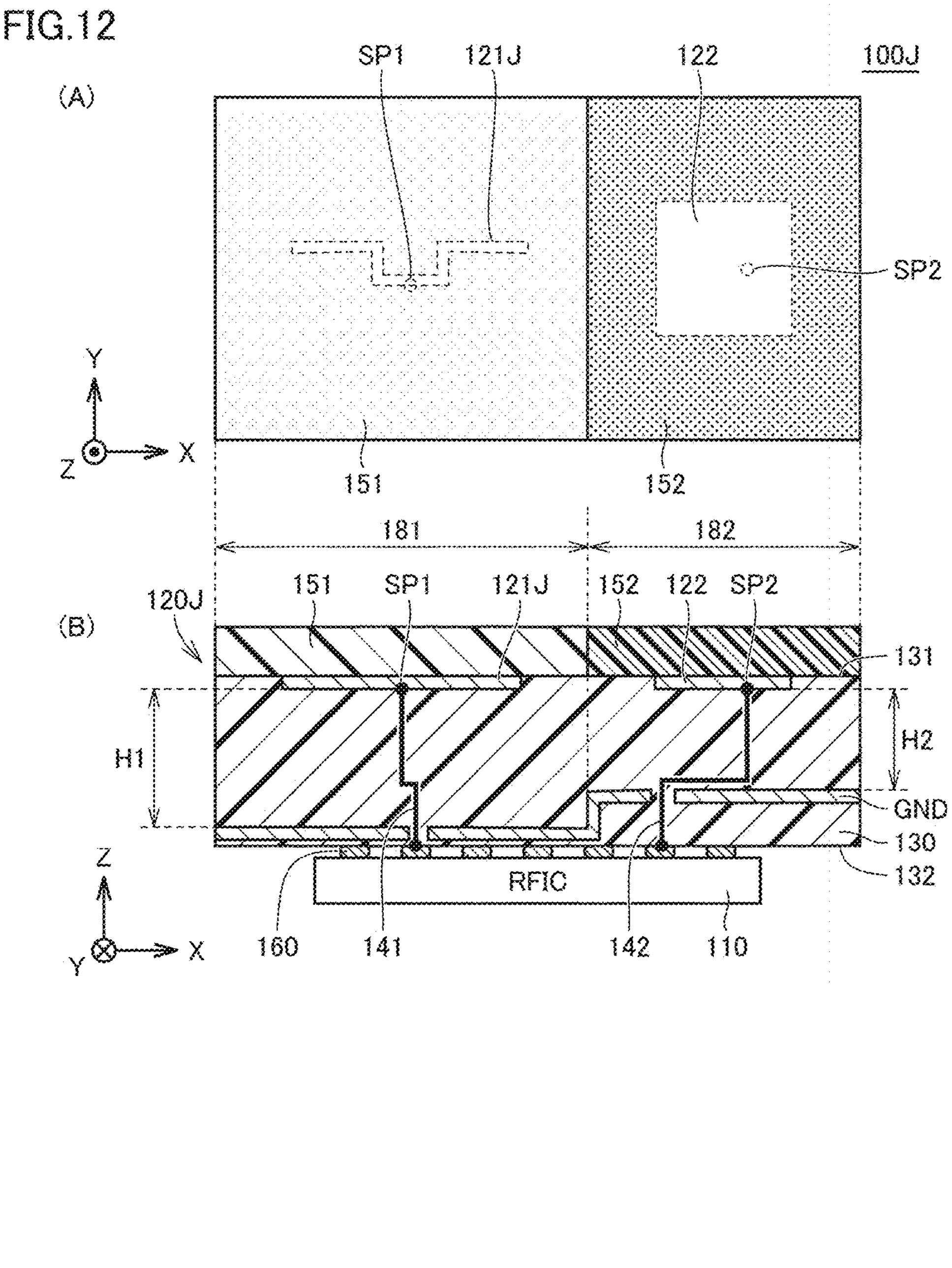
FIG. 12 is a plan view of an antenna module according to Embodiment 8 and is also a side perspective view thereof.

FIG. 12 is a plan view of an antenna module 100J according to Embodiment 8 and is also a side perspective view thereof. With reference to FIG. 12, an antenna device 120J of the antenna module 100J has a configuration in which the radiating element 121 in the antenna module 100 illustrated in FIG. 2 is replaced with a radiating element 121J. For the antenna module 100J, description of components leading to redundancy of those in FIG. 2 is not repeated.

The radiating element 121J is a dipole antenna and is disposed near the center of the first portion 181 in the dielectric substrate 130 in such a manner as to extend in the X-axis direction. Further, the radiating element 121J is disposed such that the distance H1 between the radiating element 121J and the ground electrode GND in the dielectric substrate 130 is longer than the distance H2 between the plate-shaped radiating element 122 and the ground electrode GND. In other words, the distance H2 between the plate-shaped radiating element 122 and the ground electrode GND is shorter than the distance H1 between the radiating element 121J and the ground electrode GND. The dielectric layer 151 is disposed in the first portion 181 in such a manner as to cover the radiating element 121J, and the dielectric layer 152 is disposed in the second portion 182 in such a manner as to cover the radiating element 122.

Typically, it is known that the characteristics of a dipole antenna are improved as the dipole antenna is farther away from the ground electrode GND. Accordingly, in the case of using the dipole antenna as the radiating element for the lower frequencies and the patch antenna as the radiating element for the higher frequencies, the deterioration of the characteristics of the dipole antenna can be prevented by setting the distance between the radiating element and the ground electrode GND in the region where the dipole antenna is disposed longer than the distance between the radiating element and the ground electrode GND in the region where the patch antenna is disposed.

(Modification)

For a modification, differently disposing a dipole antenna in the case of using the dipole antenna as the radiating element for the lower frequencies as in FIG. 12 will be described.

Figure 13:
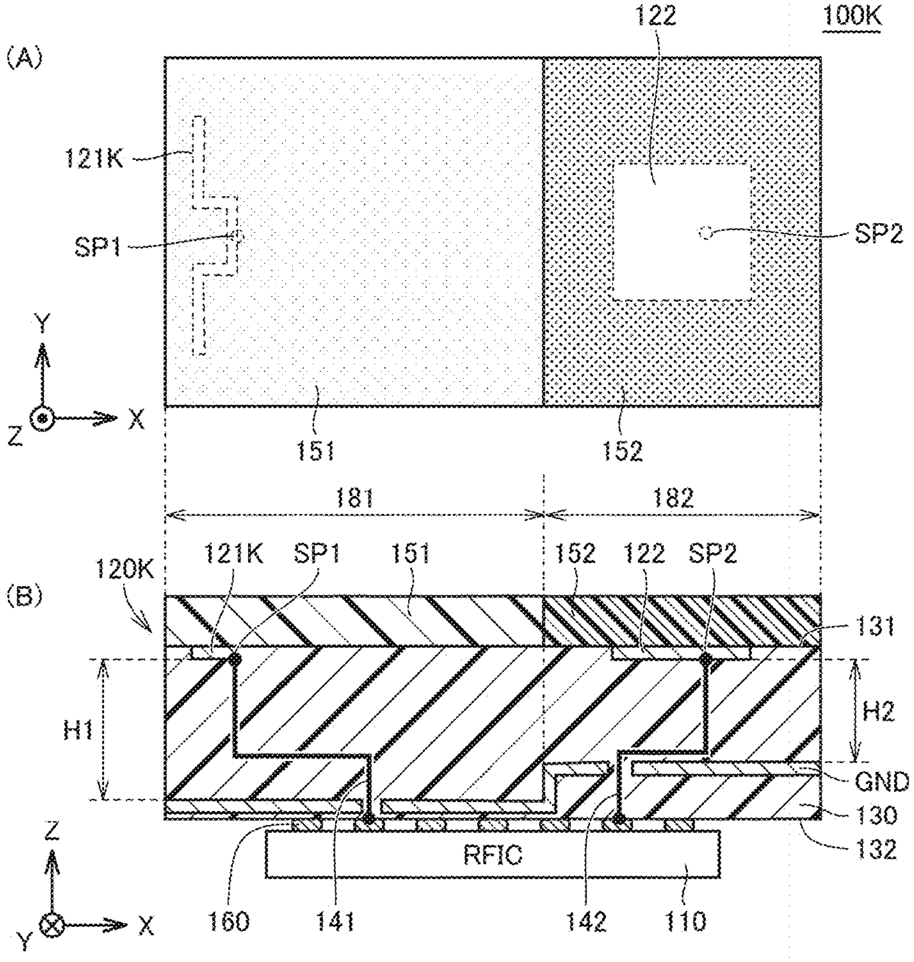
FIG. 13 is a plan view of an antenna module of a modification and is also a side perspective view thereof.

FIG. 13 is a plan view of an antenna module 100K according to the modification and is also a side perspective view thereof. With reference to FIG. 13, an antenna device 120K of the antenna module 100K has a configuration in which the radiating element 121J in the antenna module 100J in FIG. 12 is replaced with a radiating element 121K. The radiating element 121K is also a dipole antenna; however, the radiating element 121K is disposed along the Y axis and in proximity to a side surface of the dielectric substrate 130 in the negative direction along the X axis. The radiating element 121K is disposed such that the distance H1 between the radiating element 121K and the ground electrode GND in the dielectric substrate 130 is longer than the distance H2 between the plate-shaped radiating element 122 and the ground electrode GND.

Also in the antenna module 100K in the modification, the deterioration of the characteristics of the dipole antenna can be prevented by setting the distance between the radiating element and the ground electrode GND in the region where the dipole antenna is disposed longer than the distance between the radiating element and the ground electrode GND in the region where the patch antenna is disposed.

The embodiments disclosed this time are to be construed as being illustrative and not restrictive in all respects. It is intended that the scope of the present disclosure is defined by the scope of claims, not by the description of the embodiments above, and include the meaning equivalent to the scope of claims and any change made within the scope.

The invention claimed is:

1. An antenna module comprising:
- a dielectric substrate;
- a first radiating element disposed on the dielectric substrate;
- in a plan view in a direction of a normal line of the dielectric substrate, a second radiating element disposed adjacent to the first radiating element;
- a ground electrode disposed to face the first radiating element and the second radiating element;
- a first dielectric layer disposed to cover the first radiating element,
- wherein the first radiating element is capable of emitting an electric wave in a first frequency band,
- wherein the second radiating element is capable of emitting an electric wave in a second frequency band higher than the first frequency band,
- wherein a dielectric constant of the first dielectric layer is higher than a dielectric constant of the dielectric substrate, and
- wherein a distance between the second radiating element and the ground electrode is shorter than a distance between the first radiating element and the ground electrode; and
- a second dielectric layer disposed to cover the second radiating element,
- wherein a dielectric constant of the second dielectric layer is lower than the dielectric constant of the first dielectric layer.

2. The antenna module according to claim 1,
- wherein the second radiating element is disposed in a location between the first radiating element and the ground electrode in the direction of the normal line of the dielectric substrate.

3. The antenna module according to claim 1,
- wherein the ground electrode includes a first portion facing the first radiating element and a second portion facing the second radiating element, and
- wherein compared with the first portion, the second portion is disposed in a location close to the second radiating element in the direction of the normal line of the dielectric substrate.

4. The antenna module according to claim 1,
- wherein the second dielectric layer is thinner than the first dielectric layer.

5. The antenna module according to claim 1, further comprising:
- in the plan view in a direction of the normal line of the dielectric substrate, a shielding material that is disposed between the first radiating element and the second radiating element and that is electrically connected to the ground electrode.

6. The antenna module according to claim 1,
- wherein the first radiating element and the second radiating element are configured to be capable of emitting respective electric waves in two different polarization directions.

7. The antenna module according to claim 6,
- wherein an angle between a polarization direction of one of the electric waves that is emitted from the first radiating element and a polarization direction of one of the electric waves that is emitted from the second radiating element is greater than zero degrees and less than 90 degrees.

8. The antenna module according to claim 6,
- wherein in the plan view in the direction of the normal line of the dielectric substrate, each of the first radiating element and the second radiating element has a rectangular shape, and
- wherein an angle between a side of the first radiating element and a side of the second radiating element is greater than zero degrees and less than 90 degrees.

9. The antenna module according to claim 6,
- wherein each of the first radiating element and the second radiating element is supplied with a corresponding one of a first signal and a second signal that are mutually different, and
- wherein a polarization direction of one of the electric waves that corresponds to the first signal emitted from the first radiating element is orthogonal to a polarization direction of one of the electric waves that corresponds to the first signal emitted from the second radiating element.

10. The antenna module according to claim 1, further comprising:
- a feed circuit that supplies a radiating element with a radio-frequency signal.

11. A communication apparatus equipped with the antenna module according to claim 1.

12. An antenna module comprising:
- a dielectric substrate;
- a first antenna group disposed on the dielectric substrate and including at least one first radiating element;
- a second antenna group including at least one second radiating element and disposed adjacent to the first antenna group in a plan view in a direction of a normal line of the dielectric substrate;
- a ground electrode disposed to face the first antenna group and the second antenna group;
- a first dielectric layer disposed to cover the first antenna group,
- wherein the at least one first radiating element is capable of emitting an electric wave in a first frequency band,
- wherein the at least one second radiating element is capable of emitting an electric wave in a second frequency band higher than the first frequency band,
- wherein a dielectric constant of the first dielectric layer is higher than a dielectric constant of the dielectric substrate, and wherein a distance between the second antenna group and the ground electrode is shorter than a distance between the first antenna group and the ground electrode; and a second dielectric layer disposed to cover the second antenna group, wherein a dielectric constant of the second dielectric layer is lower than the dielectric constant of the first dielectric layer.

13. The antenna module according to claim 12, further comprising:

a feed circuit capable of supplying a radiating circuit with a radio-frequency signal.

14. A communication apparatus equipped with the antenna module according to claim 12.

* * * * *